Figure 1:
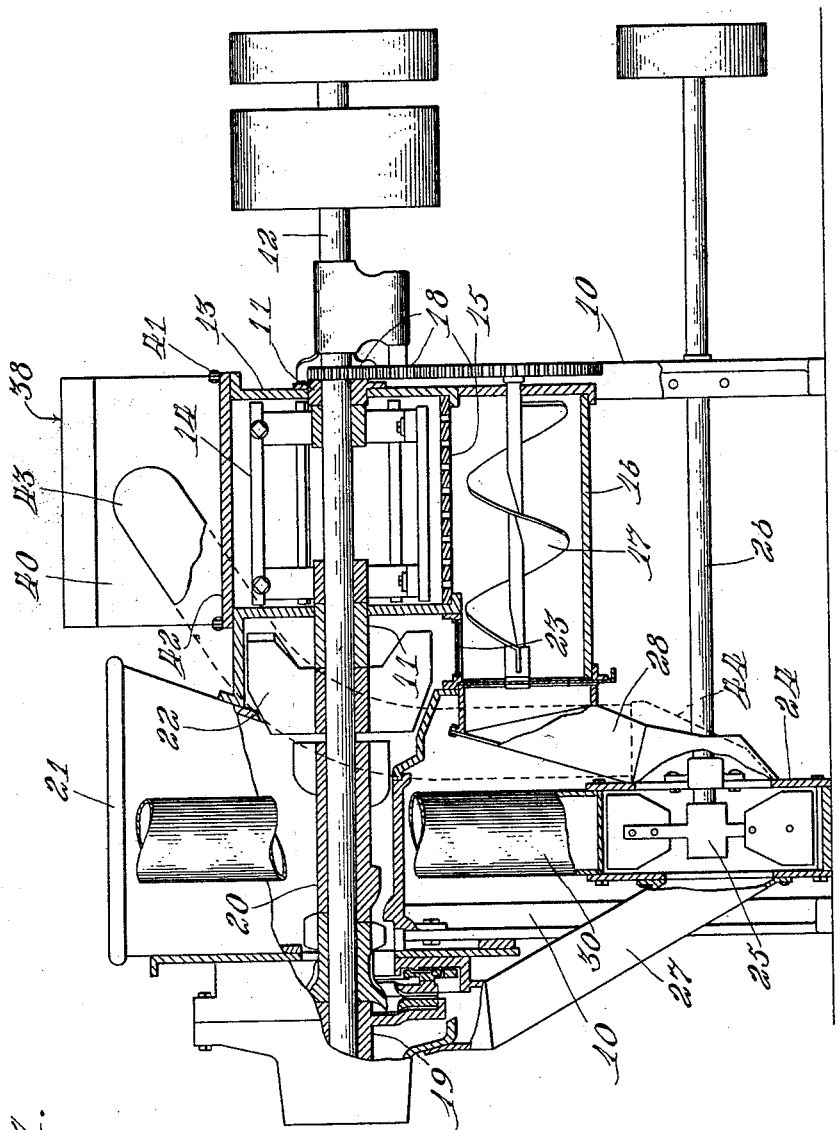

March 29, 1932. J. HOLLAND-LETZ 1,851,316
ROUGHAGE MILL
Filed June 17, 1929 2 Sheets-Sheet 1

Inventor.
John Holland-Letz.
By John P. Smith
Atty.

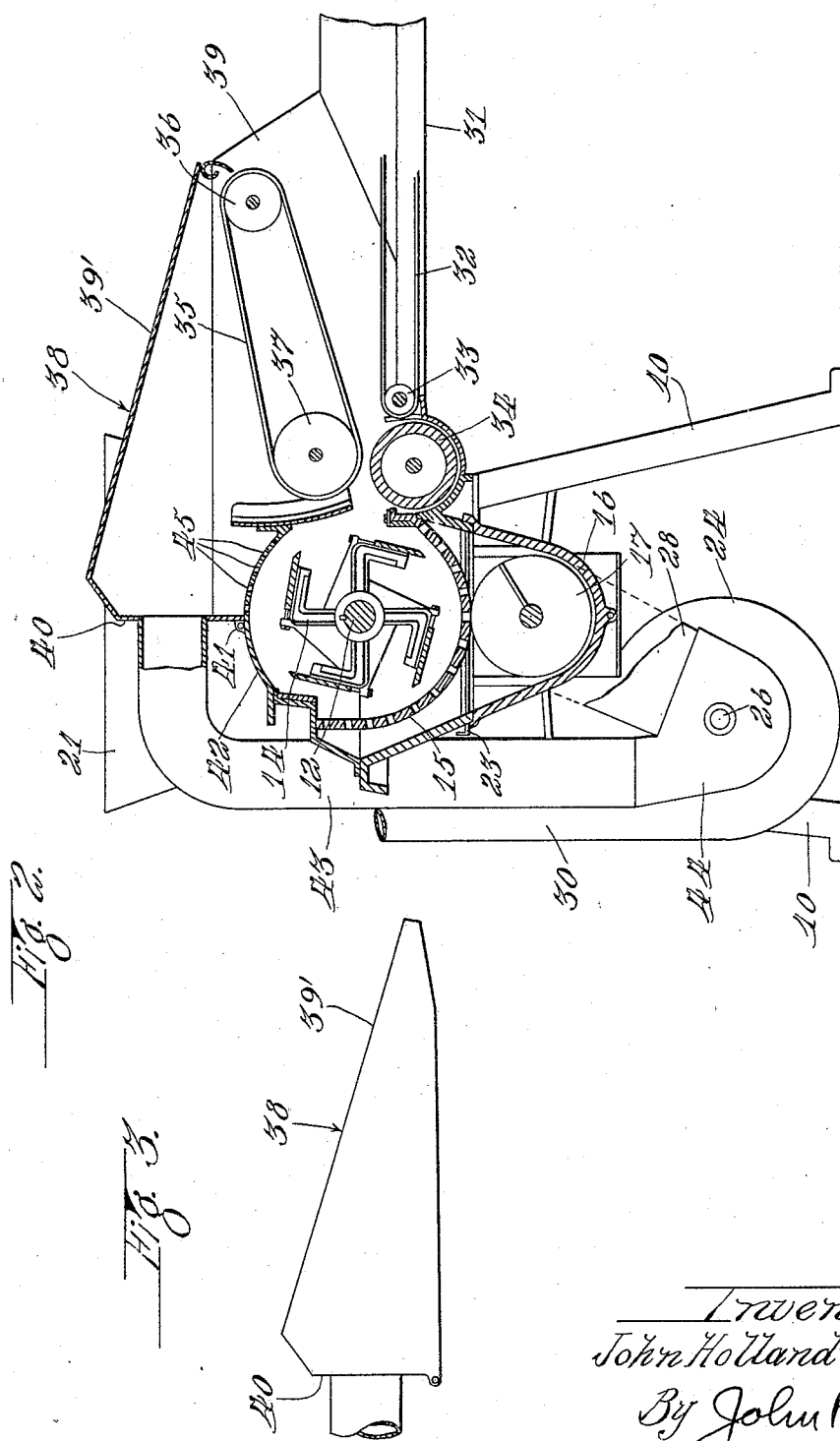

Patented Mar. 29, 1932

1,851,316

UNITED STATES PATENT OFFICE

JOHN HOLLAND-LETZ, OF CROWN POINT, INDIANA, ASSIGNOR TO THE LETZ MANUFACTURING COMPANY, A CORPORATION OF INDIANA

ROUGHAGE MILL

Application filed June 17, 1929. Serial No. 371,668.

The present invention relates to a cutting and grinding apparatus or roughage mill.

One of the objects of the present invention is to provide an improved construction of a cutting and grinding mill whereby the pulverized material or dust arising from the material passing into the cutter head, is prevented from passing through the mill so that the efficiency and capacity of the machine is increased to a maximum.

A further object of the invention is to provide a suction mechanism in combination with the cutting and conveying mechanism whereby the dust created in the operation of cutting the silage or other material which is objectionable to the operator is entirely eliminated.

A further object of the invention is to provide a grinding mill in which a suction casing is positioned over the cutter head and over a portion of the conveying mechanism adjacent thereto for withdrawing the dust and dirt created in the operation of feeding various materials to the cutter head.

These and other objects are accomplished by providing a construction and an arrangement of the various parts in the manner hereinafter described and particularly pointed out in the appended claim.

Referring to the drawings, Fig. 1 is an end elevational view partly in cross-section showing a roughage mill having my invention embodied therein.

Fig. 2 is a side elevational view partly in cross section for the roughage mill shown in Fig. 1, and Fig. 3 is a side elevational view of the suction housing or casing which extends over a portion of the cutter head and conveying mechanism for withdrawing the dust and pulverized materials from the material as it is being fed into the cutter head.

The present invention is directed to an improvement on my co-pending application, Serial No. 180,085, filed Apr. 1, 1927, for a cutting and grinding apparatus.

After the manner described and claimed in my co-pending application, the grinding mill illustrated in the drawings, comprises a frame supporting structure indicated by the reference character 10, on which is mounted in suitable bearings 11 a main shaft 12. Mounted on the frame in any well known manner, is a cutter head casing 13 in which is mounted and operatively driven by the shaft 12 is a cutter head 14. Arranged concentrically around the lower side of the cutter head 14 is an apertured grate 15 through which the material passes into a chute or conveyor trough 16. Mounted in the conveyor trough and journaled in the opposite ends thereof is a conveyor screw 17 which is operatively driven by a suitable train of gears 18 geared to the main drive shaft 12. Mounted on the one end of the shaft and operatively driven thereby is a grinding mechanism generally indicated by the reference character 19. Mounted adjacent the grinding mechanism 19 and secured to the shaft 12 is a conveyor screw 20, over which is mounted a hopper 21 through which grain may be inserted. Mounted between the screw 20 and the cutter head 13 is an elevating screw 22 which is positioned above a removable plate 23 which may be removed for opening communication between the trough 16 and the elevating screw 22. Mounted between the cutting mechanism 19 and the conveyor trough 16 is a pneumatic mixing mechanism which comprises a fan casing 24. Mounted in the casing 24 is a revolving suction or mixing fan 25 which is secured on one end of a shaft 26. Communicating with the grinding mechanism and the mixing casing 24 is a conduit 27 through which the ground material is fed into the axial center of the casing on one side thereof. Communicating with one end of the trough 16 is a second conduit 28 which communicates with the other side of the axial center of the casing 24.

Extending tangentially with the fan casing 24 is a vertically extending conduit 30 through which the material may be elevated into an elevated receptacle or container. Extending forwardly from the front side of the frame of the machine from a point adjacent the revolving cutter head 14 is a conveyor platform 31 on which is mounted an endless conveyor belt 32 which is trained about two rollers 33 mounted on the opposite ends of the conveyor platform (only one of which is shown in Fig. 2). Mounted between the inner roller 33 and the cutter head 14 is a supplemental relatively larger or idle roller 34. Positioned adjacent the delivery end of the conveyor belt 32 is a floating feed conveyor generally indicated by the reference character 35 which comprises a relatively stationary revolving roller 36 and a rearward floating larger roller 37.

One of the essential features of the present invention is the provision of a suction housing generally indicated by the reference character 38 which is adapted to fit over the side frame members 39 of the conveyor frame 31 and completely encase the floating feed belt 35 as well as the delivery end of the conveyor belt 32. This suction housing has its upper side inclined downwardly as shown at 39' and is provided with a rearward vertically extending wall 40 which has its lower end secured to a flange 41 formed on the top or cover 42 of the cutter head housing. Communicating with the suction housing 38 and preferably to the vertically extending wall 40 is a suction conduit 43 which in turn is connected through an elbow 44 to the mixing fan casing 24. A portion of the cover 42 of the cutter head housing is provided with a plurality of apertures as indicated at 45 so as to permit the pulverized or dust particles to be withdrawn from within the cutter head housing so as to prevent this material from passing through the cutter housing grate 15. This arrangement, of course, increases the capacity of the machine in that it eliminates the smaller particles from clogging the grate.

From the above description it will be seen that by having the suction housing 38 completely embrace the floating feeder belt 35 as well as the delivery end of the conveyor belt 32 and at the same time permitting the dust particles to be withdrawn from within the cutter head casing that I have provided a very efficient means for eliminating the dust and dirt (objectionable to the operator) from being spread in all directions adjacent the mill and thereby increase the capacity of the machine.

While in the above specification I have described one embodiment which my invention may assume in practice, it will, of course, be understood that the same is capable of modification and that modification may be made without departing from the spirit and scope of the invention as expressed in the following claim.

What I claim as my invention and desire to secure by Letters Patent is:

In combination with a roughage mill, a cutter head for said roughage mill, a casing for said cutter head having a portion of the top thereof provided with a plurality of apertures, a conveyor frame mounted on said mill having an endless conveyor belt mounted therein for conveying the material to said cutter head, said conveyor frame having vertically extending sides positioned adjacent the delivery end thereof, a floating feed belt mounted between the sides of said conveyor frame and positioned over the delivery end of said conveyor belt, a suction mechanism associated with said mill and a housing having an inclined top communicating with said suction mechanism and positioned above said floating feed belt, said housing being supported on the side frame members of said conveyor frame and arranged so as to communicate with the apertures formed in the top of said cutter head casing for withdrawing the pulverized material from within the cutter head casing and from the delivery end of said conveyor belt.

In testimony whereof I have signed my name to this specification, on this 12th day of June, A. D. 1929.

JOHN HOLLAND-LETZ.